June 19, 1956  D. W. HUEBNER  2,751,420
HYDRATION OF OLEFINES USING ALTERNATING
CATALYST AND SCRUBBING ZONES
Filed July 23, 1951
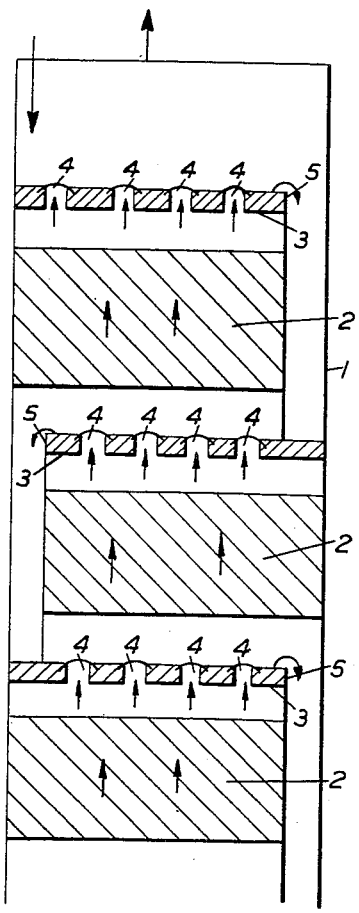
Inventor
*Denis William Huebner*
By *Cushman, Darby & Cushman*
Attorneys United States Patent Office 2,751,420
Patented June 19, 1956

2,751,420

HYDRATION OF OLEFINES USING ALTERNATING CATALYST AND SCRUBBING ZONES

Denis William Huebner, Norton-on-Tees, England, assignor to Imperial Chemical Industries Limited, a corporation of Great Britain Application July 23, 1951, Serial No. 238,070

Claims priority, application Great Britain August 4, 1950

7 Claims. (Cl. 260—641)

Various reactions, such as the hydrogenation of high-boiling liquids and direct hydration of olefins, require a component or components predominantly in the liquid phase and a component or components predominantly in the vapour phase, the two components having to be contacted with each other over a solid catalyst which may be in the form of pellets. The liquid portion of the material fed to the converter or part of this portion may be required for the reaction itself, and/or it may be required for the purpose of scrubbing out the reaction product. In either case the maximum output of desired product requires intimate contact between the liquid and vapour phases.

The simplest form of converter would consist of a cylindrical vessel of suitable dimensions packed with catalyst pellets or other suitable form of solid catalyst, the material which is predominantly liquid under the conditions of reaction being fed to the top of the converter and distributed uniformly over the catalyst bed, the predominantly vapour phase reactant being caused to flow co-currently or countercurrently as desired.

This type of converter suffers from the following disadvantages:

(1) It is difficult to maintain good distribution of the liquid phase over the catalyst throughout the converter as is necessary to obtain a good output of desired product in the case when the liquid takes part in the reaction. This difficulty is particularly serious if the catalyst consists of pellets small compared with the diameter of the converter and/or of material which is not readily wetted by the liquid. The liquid then tends to form a limited number of relatively large channels.

(2) At constant space velocity, i. e., constant volume fed per hour per unit of bulk volume of catalyst, the liquid loading, i. e. the quantity of liquid fed per hour to unit cross section of the catalyst bed, is proportional to the depth of the bed, which may be 30 feet or more in commercial scale converters. The large liquid loading under these conditions can lead to flooding of the bed with consequent loss of output in cases where the reaction takes place predominantly in the vapour phase; it can also under certain circumstances, particularly in the case of high pressure reactions, cause serious catalyst erosion, thereby shortening the life of the catalyst and contaminating the product with catalyst material.

These difficulties could be overcome by disposing the catalyst in the converter in the form of a number of relatively shallow beds to each of which reactants would be fed separately and from each of which products would be separately withdrawn. In this way the catalyst bed would be effectively increased in area and reduced in depth without using a reactor with a very large ratio of diameter to length which would be of unsatisfactory mechanical design. This solution to the problem would require the provision of a large number of separate feed points and a similar number of points for the withdrawal of product, and would therefore lead to a complicated design of converter. The numerous feed streams would also have to be measured and controlled separately. Capital and operating costs of the auxiliary equipment would thus be greatly increased.

It is an object of this invention to overcome these difficulties by improved reactor design and reaction conditions.

According to the invention there is provided a converter for reactions between reactants which are at least partly in the gaseous phase in the presence of a liquid reactant and/or solvent and of a solid catalyst with which at least the gaseous phase reactant or reactants must be contacted, this converter containing at least two separate beds of catalyst in series, there being provided liquid-vapour contacting means between each two consecutive catalyst beds, means for introducing material to be present during reaction so that the liquid and gaseous phases flow countercurrently through the converter, and means associated with the said liquid-vapour contacting means to cause the liquid material to flow through the converter at least partly without coming into contact with the catalyst.

In this way the liquid and vapour phases are brought intimately into contact with each other between the catalyst beds. The portion of liquid flowing over the catalyst may be maintained at any desired amount by means of suitable proportioning devices or, alternatively, the catalyst may be kept completely dry, which is quite possible at least where the reactions are exothermic.

The liquid-vapour contacting means may be in the form of bubble-trays, packed part columns, sieve plates, rotary brush scrubbers or any other suitable form. It is often preferable to arrange the catalyst beds one above the other.

Also according to the invention, a method of carrying out reactions between reactants which are at least partly in the gaseous phase in the presence of a liquid reactant and/or solvent and of a solid catalyst with which at least the gaseous phase reactant or reactants must be contacted comprises introducing liquid and gaseous materials to be present during reaction into a converter containing at least two separate beds of catalyst in series and liquid-vapour contacting means provided between each two consecutive catalyst beds, causing said liquid and gaseous materials to flow countercurrently through the converter and adjusting the flow of the liquid material to cause it to flow through the converter at least partly without coming into contact with the catalyst.

In this specification the term "gaseous" is intended to refer to those substances which are usually gaseous and those which are in vapour form under the conditions of operation.

The term "solvent" is intended also to cover a washing, scrubbing or heat transferring liquid or a liquid to be used for any similar purpose.

The depth of the separate catalyst beds is a matter to be decided in individual cases. It will depend inter alia on the rate of the desired reaction, the heat change which accompanies it, and the rate and extent of side reactions. The beds need not all be of similar depth, e. g., in cases where the reaction is accompanied by a substantial heat change, the depth may be determined by the adiabatic temperature rise which is permissible before restoring the vapour phase to or near to its original temperature by contact with the liquid, which will in general have a greater heat capacity. In this case the beds will become deeper in those parts of the converter where the reaction is proceeding most slowly, and this will also be the case where the limiting factor is the consumption of one or other of the reactants or the approach to chemical equilibrium.

The invention is applicable to a large variety of reactions, for example to carbonylation reactions, by which we mean in this specification reactions between an olefine, carbon monoxide and hydrogen to produce an aldehyde or alcohol using solid catalyst material and to the hydrogenation of creasote or fuel oil. It is, however, particularly suitable for the direct catalytic hydration of olefines such as ethylene or propylene at high pressures and temperatures.

One way in which the invention may be put into effect is illustrated diagrammatically in the single figure of the accompanying drawing. In this, 1 is a converter in which there are shown three separate catalyst beds 2. Between each two consecutive beds, and above the top one, there are arranged bubble trays with bubble caps 4, each tray having an overflow 5 for the liquid material. The liquid material descends the column while the gaseous material ascends. Suitable proportioning devices (not shown) such as adjusting means for the overflows may be provided for ensuring a desired amount of the liquid wetting the catalyst, unless it is desired to keep the catalyst completely dry, which may be the case for certain reactions; this is quite possible at least where the reactions are exothermic.

*Example*

In the direct hydration of propylene to isopropanol carried out by passing at a pressure of 250 atmospheres and a temperature of 270° C. 7 parts by weight of water and 1 part by weight of propylene over an unsupported pelleted catalyst containing blue oxide of tungsten, at a rate of 3 litres of reactants per litre of catalyst bulk space per hour, improved outputs were obtained by dividing the catalyst bed of a total effective depth of 70 feet and a diameter of 3 feet 8 inches into individual beds of depths listed below where the numbers refer to the beds as counted from the top of the converter downwards, bubble trays being inserted between each pair of successive beds.

| Bed numbers: | Depths, feet |
|---|---|
| 1, 2 | 3.5 |
| 3, 4 | 4.5 |
| 5, 6 | 5.5 |
| 7, 8 | 9.0 |
| 9, 10 | 12.5 |

The bubble trays were designed so that 10% of the total water fed to the top of the converter passed directly over the catalyst in each bed, the remaining 90% passing from tray to tray out of contact with the catalyst. It was found that, whereas without the use of bubble trays according to the invention the output was 0.14 kg. of isopropanol per litre of catalyst bulk space per hour, with the arrangement according to the invention as described, this output rose to .20 kg. of isopropanol per litre of catalyst bulk space per hour. It was also found that the catalyst life could be increased by using the invention by a factor of 2 or more.

I claim:
1. A process for the direct hydration of olefines in the presence of an unsupported pelleted catalyst containing blue oxide of tungsten which comprises passing gaseous olefine under superatmospheric pressure and at superatmospheric temperature upwardly through a plurality of superimposed alternate catalyst hydration zones and scrubbing zones, passing water in the liquid phase through said scrubbing zones, contacting the gaseous products from each catalyst hydration zone with said liquid water in the scrubbing zone immediately above said catalyst hydration zone and passing a substantial minor portion of said water in the liquid phase from said scrubbing zone on to the catalyst hydration zone below it, the remaining portion of said water in the liquid phase being passed from said scrubbing zone to the scrubbing zone next below.

2. A process for the direct hydration of propylene to isopropanol in the presence of an unsupported pelleted catalyst containing blue oxide of tungsten which comprises passing gaseous propylene under superatmospheric pressure and at superatmospheric temperature upwardly through a plurality of superimposed alternate catalyst hydration zones and scrubbing zones, passing water in the liquid phase through said scrubbing zones, contacting the gaseous products from each catalyst hydration zone with said liquid water in the scrubbing zone immediately above said catalyst hydration zone and passing a substantial minor portion of said water in the liquid phase from said scrubbing zone on to the catalyst hydration zone below it, the remaining portion of said water in the liquid phase being passed from said scrubbing zone to the scrubbing zone next below.

3. A process as claimed in claim 2 in which the pressure is 250 atmospheres and the temperature is 270° C.

4. A process as claimed in claim 2 in which the portion of water passed to the solid catalyst hydration zones is of the order of 10% of the total water fed to the process.

5. A process as claimed in claim 2 in which the weight ratio of propylene to water fed to the process is of the order of 1:7.

6. A process for the direct hydration of olefines in the presence of an unsupported pelleted catalyst containing blue oxide of tungsten which comprises passing gaseous olefine under superatmospheric pressure and at superatmospheric temperature upwardly through a plurality of superimposed alternate catalyst hydration zones and scrubbing zones, lower catalyst hydration zones exceeding in depth catalyst hydration zones thereabove, passing water in the liquid phase through said scrubbing zones, the weight ratio of olefine to water fed to the process being of the order of 1:7, contacting the gaseous products from each catalyst hydration zone with said liquid water in the scrubbing zone immediately above said catalyst hydration zone, passing a substantial minor portion of said water in the liquid phase from said scrubbing zone on to the catalyst hydration zone below it, the remaining portion of said water in the liquid phase being passed from said scrubbing zone to the scrubbing zone next below.

7. A process for the direct hydration of propylene to isopropanol in the presence of an unsupported pelleted catalyst containing blue oxide of tungsten which comprises passing gaseous propylene under superatmospheric pressure and at superatmospheric temperature upwardly through a plurality of superimposed alternate catalyst hydration zones and scrubbing zones, lower catalyst hydration zones exceeding in depth catalyst hydration zones thereabove, passing water in the liquid phase through said scrubbing zones, contacting the gaseous products from each catalyst hydration zone with said liquid water in the scrubbing zone immediately above said catalyst hydration zone, passing a substantial minor portion of said water in the liquid phase from said scrubbing zone on to the catalyst hydration zone below it, the remaining portion of said water in the liquid phase being passed from said scrubbing zone to the scrubbing zone next below.

References Cited in the file of this patent

UNITED STATES PATENTS

| 2,130,669 | Lewis | Sept. 20, 1938 |
| 2,141,275 | Lewis | Dec. 27, 1938 |
| 2,142,036 | Rowland et al. | Dec. 27, 1938 |
| 2,256,622 | Murphree et al. | Sept. 23, 1941 |
| 2,337,419 | Sensel | Dec. 21, 1943 |
| 2,531,284 | Levy et al. | Nov. 21, 1950 |
| 2,536,768 | Reynolds et al. | Jan. 2, 1951 |
| 2,582,688 | Ford | Jan. 15, 1952 |

FOREIGN PATENTS

| 139,241 | Canada | Mar. 19, 1912 |
| 622,937 | Great Britain | May 10, 1949 |
| 646,284 | Great Britain | Nov. 22, 1950 |

OTHER REFERENCES

FIAT Final Report 968, April 2, 1947, pp. 5, 11, 31, Figures 2 and 3.